United States Patent [19]

Horst et al.

[11] Patent Number: 5,710,549
[45] Date of Patent: Jan. 20, 1998

[54] ROUTING ARBITRATION FOR SHARED RESOURCES

[75] Inventors: Robert W. Horst, Saratoga, Calif.; William J. Watson; David P. Sonnier, both of Austin, Tex.

[73] Assignee: Tandem Computers Incorporated, Cupertino, Calif.

[21] Appl. No.: 483,663

[22] Filed: Jun. 7, 1995

Related U.S. Application Data

[63] Continuation-in-part of Ser. No. 316,431, Sep. 30, 1994, abandoned.

[51] Int. Cl.[6] .................................................. H04Q 1/18
[52] U.S. Cl. ............................... 340/825.5; 370/462
[58] Field of Search ......................... 340/825.5, 825.51; 370/444, 455, 462, 461, 447; 395/291, 296, 303, 650, 728, 729, 731, 732, 299, 860, 861, 862

[56] References Cited

U.S. PATENT DOCUMENTS

| | | | |
|---|---|---|---|
| 3,699,524 | 10/1972 | Norberg | 340/825.5 |
| 4,663,756 | 5/1987 | Retterath | 340/825.5 |
| 5,072,363 | 12/1991 | Gallagher | 395/725 |
| 5,210,871 | 5/1993 | Lala et al. | 395/650 |
| 5,388,097 | 2/1995 | Baugher et al. | 370/455 |
| 5,388,228 | 2/1995 | Heath et al. | 395/303 |
| 5,392,033 | 2/1995 | Oman et al. | 340/825.5 |
| 5,479,158 | 12/1995 | Sato | 340/825.5 |

*Primary Examiner*—Edwin C. Holloway, III
*Attorney, Agent, or Firm*—Townsend and Townsend and Crew LLP

[57] ABSTRACT

A data communicating device, having a number of inputs whereat data is received for communication from one of a number of outputs of the device, includes apparatus for providing two levels of arbitration to select one of the inputs for data communication to an output. The first (lower) level of arbitration bases selection upon a round-robin order; the second (higher) arbitration level selects inputs based upon an indication from an input of an undue wait for access to the output over a period of time. Each input is provided a modulo-N counter, and a digital counter. Each time an input contends for access to an output and loses to selection by the output to another input, the modulo-N counter is incremented by an assigned value for that input. When N is exceed without access, the digital counter is incremented. The content of the counter operates to force the high-level arbitration.

13 Claims, 3 Drawing Sheets

| ARBITRATION PERIOD | (IF=64/256) PORT INPUT I(0) | (IF=64/256) PORT INPUT I(1) | (IF=128/256) PORT INPUT I(2) |
|---|---|---|---|
| T-1 | 0 [0] | 0 [0] | 0 [0] |
| T | 0 [0] | 0 [0] | 0 [0] |
| T+1 | 64 [0] | 64 [0] | 128 [0] |
| T+2 | 128 [0] | 128 [0] | 0 [1] |
| T+3 | 192 [0] | 192 [0] | 128 [0] |
| T+4 | 0 [1] | 0 [1] | 0 [1] |
| T+5 | 64 [0] | 64 [1] | 128 [1] |
| T+6 | 128 [0] | 128 [0] | 0 [2] |
| T+7 | 192 [0] | 192 [0] | 128 [1] |
| T+8 | REPEATS ARBITRATION PERIODS T+4 TO T+7 | | |

ROUTING ARBITRATION FOR SHARED RESOURCES

This application is a continuation-in-part of application Ser. No. 08/316,431 filed Sep. 30, 1994, now abandoned.

BACKGROUND OF THE INVENTION

The present invention relates generally to a device having multiple inputs and outputs for routing message traffic in a communications network. More particularly, the invention relates to a method, and apparatus for implementing that method, to bias the arbitration between two or more inputs of the device that are contending for data communication access to the same output of the device.

As multiprocessing environments grow, the ability to provide data communication between the individual system elements (i.e., processors and peripheral equipment) of the system requires careful thought so as not to inadvertently give a system element unfair access to a communications path or some other shared resource (e.g., a multiple-user bus system) while, at the same time, limiting such access to other system elements.

Many of today's data communication networking configurations will use various devices (typically, "routers") to direct or otherwise route message traffic from one communications link to one of a number of other communications links. However, message traffic can be received at two or more inputs of the device at substantially the same time bound for the same output, raising the issue of which of the two will be allowed to proceed before the other, i.e., who goes first. Access to the output requires some form of arbitration between the two contending inputs. Smaller systems (i.e., those with a small number of system elements needing to communicate with one another) may use such classic arbitration techniques as assigning fixed priorities to the inputs or "round-robin" processing. In the former, each port input is provided a predetermined priority to form a hierarchical arbitration scheme. Inputs with higher priority will be given access to an output over inputs with lower pre-assigned priorities seeking access to that same output. The round-robin technique involves assigning priorities according to a predetermined order among the inputs. As message traffic is received, the priorities change so that the last input granted access to a particular output is then given the lowest priority, and the next input in order now has the highest priority; the remaining inputs will have their priorities similarly changed according to the predetermined order.

Similar techniques may be used in other shared resource environments such as, for example, multiple-user VME bus systems, to allocate access to the bus between connected controllers.

As computing systems become more complex, so that the number of elements (processors and peripheral units) increase, it would not be unusual for an input of a routing device to be required to route message traffic from several elements. Further, routing devices are sometimes cascaded to form, for example, tree-like network configurations, increasing the number of system elements that may need to route message traffic through an input of a routing device. Using pre-assigned priorities, round-robin processing, or other similar techniques can unfairly allocate the services of a routing device's input to some of the system's elements at the expense of other elements that use another input of that routing device. For example, a routing device may receive at one input message traffic from only one system element, while another input of that same routing device is required to service several elements. Using any of the above techniques will operate to give more of the routing device's attention to the one element, and less attention to each of the several elements using the second input. Thus, prior arbitration techniques can unfairly allocate more of the routing device's services to the input having the lesser number of system elements using that routing device.

SUMMARY OF THE INVENTION

The present invention provides a method for arbitrating between multiple users seeking access to any type of shared resource such as, for example, a shared bus structure, or as is described herein an output of a network routing device. The description of the invention is set in the context of its preferred embodiment in which it is used in a network routing device having multiple message-receiving port inputs, at least one port output, and wherein message traffic is received at one of the port inputs for routing to the port output for transmission therefrom.

The invention is based upon the concept of monitoring message traffic through each port input to escalate the priority of port inputs having waiting message traffic.

According to the preferred embodiment of the invention, two levels of arbitration are implemented: Initially, a low level priority scheme is used to arbitrate between two port inputs seeking access to a port output; to accommodate port inputs having message traffic that may have been waiting through several arbitration periods, their priorities are escalated to move them into an arbitration that momentarily uses a high priority scheme. The low-level scheme employs a simple round-robin priority order. The last port input having access to a port output has the lowest priority while the next port input in order now has the highest priority. The remaining port inputs will have descending priorities according to the round-robin order established. Priorities change each time a port input gains access to a port output.

When arbitrating at the first level, each selected port input has its received message traffic routed to the output for transmission, priority advances according to the round-robin scheme to make the priority of that port input the lowest, and appointing the next port in the round-robin sequence as the one with the highest priority.

The high level arbitration scheme monitors the message traffic through a port output, and escalates the priority of any port input having message traffic that is waiting to be routed to the port output. The amount escalated depends, in part, upon a pre-assigned bias value for each port input. The pre-assigned bias value is in the form of an input fraction (IF), and may be thought of as a port input's allocation of a portion of the bandwidth of a port output. The flow of message traffic handled by a port output is monitored so that the priority of a port input having waiting message traffic can be escalated each time a port input fails to win arbitration and access to the port output for which it is waiting. The time interval is established by the IF assigned that port input. Each arbitration period the port input participates will see an increase a modulo-N counter with a pre-assigned value. When the counter overflows, a 2-bit counter is incremented. Any non-zero count in the 2-bit counter is a signal that the associated port input has issued to the port a priority request, that its priority be escalated, and it be taken out of turn. If more than one port input has a non-zero count in their associated 2-bit counters, the high level scheme grants access to the one with the greater non-zero count. If the 2-bit counters of two or more port inputs are non-zero and equal, arbitration is conducted on any fixed priority scheme. Each time a port input having a non-zero count in its 2-bit counter is granted access the 2-bit counter is decremented.

Accordingly, any arbitration period seeing port inputs with counts other than 0 in their priority counters are arbitrated first; ties are broken by fixed priority. The assigned bias values forming the IF values for each port input are used to increase a modulo-N counter arrangement. (Here, N is 256, so that the counter will roll-over at 255). When the counter is increased beyond its maximum count (255), and rolls over, and will cause the 2-bit counter to be incremented by 1.

There are a number of advantages achieved by of the present invention. First, fair access to any port output of a routing device is given any port input—both for port inputs that are directly connected to system elements as well for port inputs that are indirectly connected to system elements (i.E., through other ports). Second, the invention allocates a minimum guaranteed portion of a port output's maximum bandwidth to any port input. Higher assigned bias values can be given to tilt access to a port output to a port input handling, for example, real-time data (e.g., video) to ensure that data is not lost waiting for other message traffic. Third, by providing assigned bias values for an entire network, a guaranteed message transmission latency between any two system elements can be established. This allows lower time-out values to be set to specified values that will be exceeded only under error conditions not due to network congestion.

These and other advantages of the present invention will become evident to those skilled in the art upon a reading of the following detailed description of the invention, which should be taken in conjunction with the accompanying drawings.

DETAILED DESCRIPTION OF THE INVENTION

Figure 1:
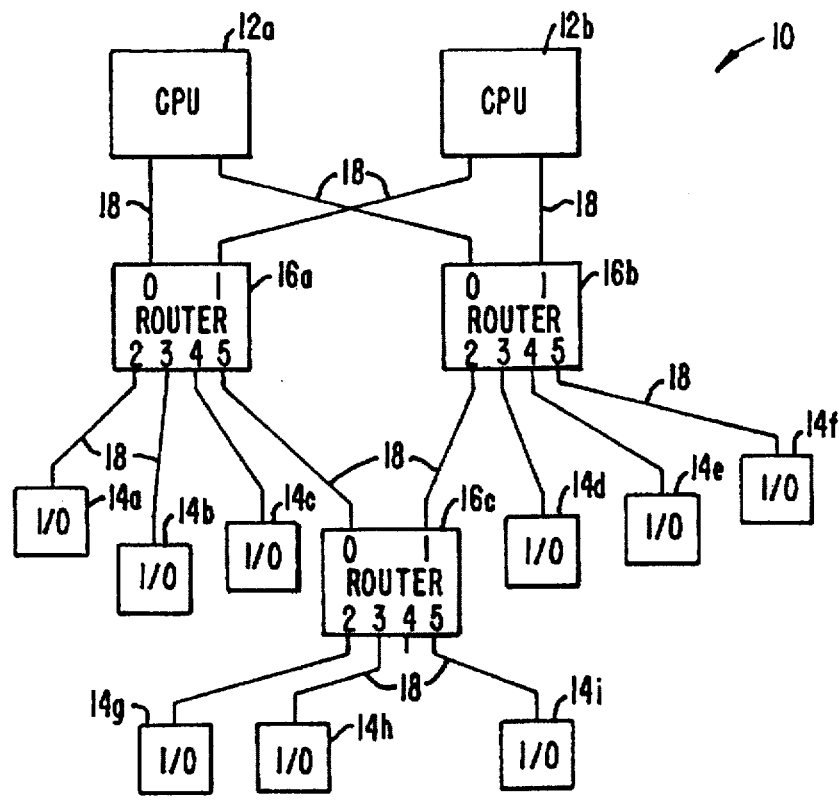
FIG. 1 is a simplified block diagram of a multiple processor system comprising a pair of central processing units (CPUs) coupled to one another and a plurality of input/output (I/O) units by a system area network ("SAN") for communicating message traffic therebetween using router units incorporating the present invention.

Turning now to the figures, and for the moment initially FIG. 1, there is illustrated a simplified multiple processing system, designated generally with the reference numeral 10. As shown, the multiple processing system 10 comprises at least a pair of central processing units (CPUS) 12a, 12b, and a plurality of input/output units 14 (14a, 14b, . . . , 14i) interconnected in a system area network configuration by routing units, or routers, 16, and bi-directional communication links 18. Preferably, message traffic between the various elements of the system 10 is in the form of data packets comprising serially transmitted 9-bit symbols, together with the necessary transmitting clocks for synchronous transfers of the symbols. The symbols are encoded to form either data or commands used for network protocol flow control. Network flow control is not relevant to the understanding or implementation of the present invention and, therefore, is not discussed further herein, except as necessary to the description of certain of the elements of the router units 16. Each message, however, contains data identifying the source and destination of the message. The destination is used by the routers 16 to select the port output from which the message will be re-transmitted.

Continuing with FIG. 1, each of the routers 16 has six bi-directional ports (0, 1, . . . , 5), each having a port input at which message traffic may be received, and a port output from which message traffic can be sent. Each of the ports 2, 3, 4 (and 0 and 1) of the router 16a services (i.e., routes traffic from) only one system element. Port 5, on the other hand, has as many as eight system elements capable of sending message traffic for routing through that port: both CPUs 12 (via routers 16b and 16c) and six I/O units 14 (via routers 16b and 16c). It is possible that all 8 possible sources could transmit message traffic to be routed via the port input of port 5 of router 16a for transmission through a port output of the router 16a, for example port output (0) of port 0.

In contrast, ports 1–4 of the router 16a have only a single element that may need to contend for access to the port output of port 0. An arbitration method in which equal access to a port output is granted each port input would provide each of the I/O units 14a, 14b, and 14c respectively connected to the ports 2, 3, and 4 with more frequent access to the port 0 than that provided the I/O units 14g, 14h, and 14i that send message traffic to port 5 of the router 16a. The present invention works to alleviate that problem by biasing port 5 of router 16a to give it more frequent access to port 0 (or any other port) than ports 2–4.

Figure 2:
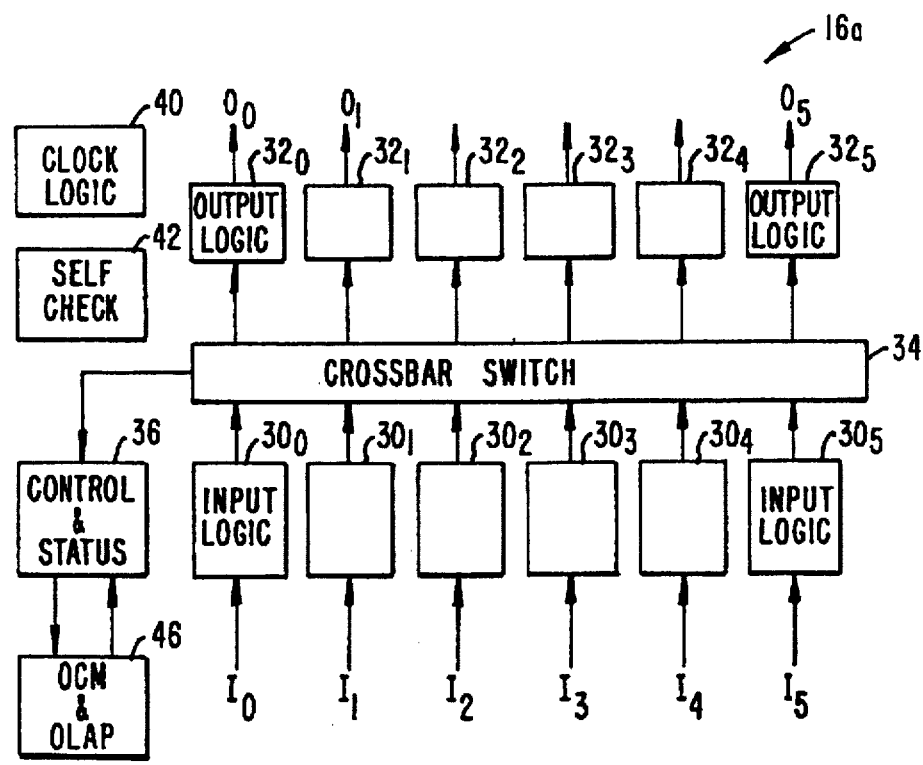
FIG. 2 is a simplified block diagram of a router unit used in the system area network of FIG. 1, illustrating its construction, including its multiple, separate input and port outputs whereat message traffic is received and re-transmitted.

Turning now to FIG. 2, a simplified block diagram of the router 16a is illustrated. It will be appreciated that the routers 16b and 16c are structured substantially the same as the router 16a, unless otherwise noted, so that the following description of the router 16a will apply equally to the routers 16b, 16c.

As indicated above, each of the ports 0, 1, . . . , 5 can receive and/or transmit message traffic. FIG. 2 shows, therefore, the router 16a as having, for each port 0, 1, . . . , 5, a port input (I) for receiving message traffic, and a port output (0) from which for message traffic is transmitted. Each port input has an associated input logic 30 ($30_0$, $30_1$, . . . , $30_5$) for handling receipt of message traffic, and output logic 32 ($32_0$, $32_1$, . . . , $32_5$) from which message traffic is transmitted. Incoming message traffic is routed from the input logic 30 of the receiving port to one of the port outputs by a crossbar switch 34, controlled in part by control and status logic 36 (as well as the individual output logic elements 32, as will be discussed further below). Thus, for example, message traffic received by the port input I(0) of port 0 is applied to the associated input logic $30_0$ and routed to a designated output logic (e.g., output logic $30_3$) by the crossbar switch 34. The port output O(3) of port 3 has output logic $32_3$ for transmitting data coupled thereto.

A control and status logic element contains the various state machines that effect synchronous control over most of the operation of the router. Additionally, the router 16a includes clock logic 40 for supplying various clocking signals necessary to synchronously operate the elements of the router, and self-check circuitry 42 that performs certain self-check operations not relevant to the invention herein with one exception.

The router 16a is equipped with an on-line access port (OLAP) 46 to communicatively connect the router to a maintenance processing system (not shown). The OLAP 46 provides the maintenance processing system with an interface through which the router can receive various operating information such as, for example, assigned bias values for each port input, as will be described below. The OLAP 46 connects to a serial bus 48 that is structured in conformance with IEEE Standard 1149.1. Thus, information may be provided the router 16a at start-up, or during ongoing operation. Those skilled in the art will realize that the IEEE Standard 1149.1 is that based upon IEEE 1149.1-1990, May 21, 1990, SH13144, Institute of Electrical and Electronic Engineers, 345 East 47th Street, New York, N.Y. 10017. For further information, reference is made to that standard.

Figure 3:
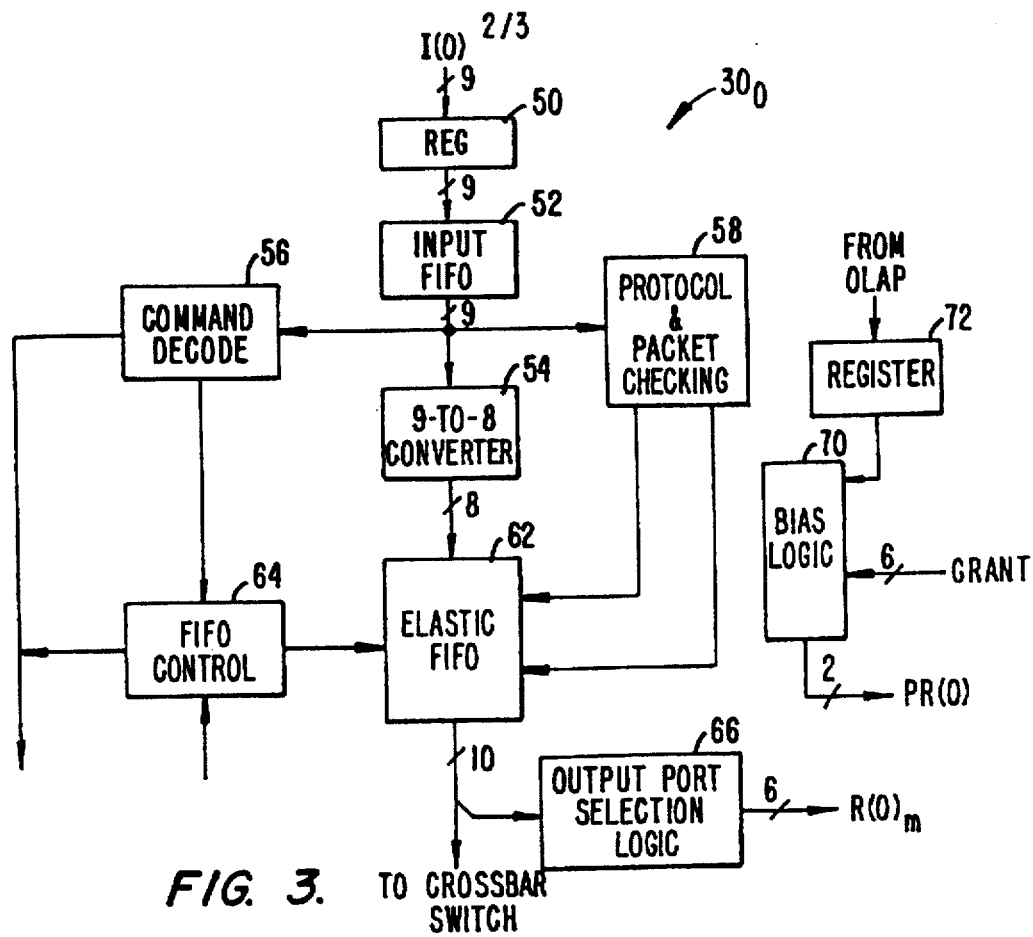
FIG. 3 is a simplified block diagram of the input logic associated with a port input of the router unit shown in FIG. 2.

Referring now to FIG. 3, a block diagram of the input logic $30_0$ is illustrated of the port input I(0). The input logic $30_1, \ldots 30_5$ for the other port input I(1), $\ldots$, I(5) are of substantially identical construction, and unless noted otherwise the description of the input logic $30_0$ should be taken as a description of the input logic $30_1, \ldots 30_5$.

FIG. 3 shows the input logic $30_0$ as including an input register 50 that operates to receive and buffer the incoming message traffic for transfer to an input first-in-first-out buffer queue (FIFO) 52. The FIFO 52 operates to provide synchronization between the clock signal (not shown) the originates at the transmitting entity, and is used to clock data into the register 50 and FIFO 52, and the (local) clock use to pull symbols from the FIFO 52.

Information from the input FIFO 52 is coupled to a 9-to-8 (bit) converter 54 that converts each 9-bit symbol from its encoded form to byte form. In addition, the output of the input FIFO 52 is coupled to a command decode element 56, and a protocol and packet checking unit 58. The command decode unit 56 examines each symbol to determine if it is a flow control command, and therefore a command that the router must act upon, or data, which need not be acted upon by the router (other than routing it to the proper port output). The protocol and packet checking unit 58 operates to ensure that the packet meets the necessary protocol of transfer, and checks the concluding check sum of the packet to ensure that the packet was transmitted to the router 16a properly. If not, the protocol and packet checking unit 58 will tack onto the end of the packet a symbol that identifies the packet as possibly being erroneous.

Incoming message traffic, passed through the 9-to-8 bit converter 54, is received and temporarily stored in an elastic FIFO 62, controlled by a FIFO control 64. The FIFO 62 provides sufficient temporary storage to allow the Destination ID of the incoming message packet to be examined, and to allow time for the port outputs to operate the crossbar switch 34 to route the message traffic. The FIFO 62 must also provide sufficient storage to allow sufficient time to halt the incoming message traffic transmission in the event the receiving port input must wait.

Selection of the proper port output, however, depends upon the destination address contained in the incoming message packet. That determination is made by the port output selection logic 66 which receives the destination address contained in the incoming message packet. From the destination address the port output selection logic 66 identifies the designated port output, asserting a request signal on one of six request lines, $R(0)_m$, where m=0, 1, $\ldots$, 5, identifying the requested port output.

Before continuing, a word about notation: as explained above, the port output selection logic 66 produces six output signals, each of which is carried on one of six request lines $R(0)_0, R(0)_1, \ldots, R(0)_5$. The form of the request signal lines is $R(n)_m$, where n (n=0, 1, $\ldots$, 5) identifies the driving source of the signal line, and m (m=1, 2, $\ldots$, 5) identifies the destination of the signal carried. Accordingly, the port output selection logic 66 for port I(0) drives the six request lines $R(0)_0, R(0)_1, \ldots, R(0)_5$ each of which couple the signal they may carry to output logic $32_0, 32_1, \ldots, 32_5$, respectively. In similar fashion, the output logic 32 of each port output will grant access, in response to received request signals, by asserting a GRANT signal on one of six signal lines $GRANT(n)_m$. Again, the n will identify the output logic driving the signal line, and the m will identify the input logic 30 receiving that driving signal. Unless noted otherwise, this notation is used throughout this discussion.

Continuing then with FIG. 3, an incoming message received by port input I(0) with a destination address that identifies, for example, the port output O(3), will cause the port input I(0) to assert a request on request signal line $R(0)_3$, signalling the port output O(3) (more accurately, the associated output logic $32_3$) that message traffic bound for it is waiting at port input I(0). The port output receiving the request signal, in turn, will respond with a grant signal on the grant signal line $GRANT(3)_0$ to signify that access is granted. When the requested output logic 32 grants access (discussed in more detail below), the designated route through the crossbar switch 34 is made, and the message packet is routed to the requested output logic from the elastic FIFO 62.

Input logic also includes bias logic 70 that receives the content of bias register 72. Bias register 72 receives assigned bias value for the associated port input I(0) that, as discussed, is indicative of that port input's portion of the bandwidth of any port output. From the content of bias register 72 the bias logic 70 monitors the arbitrations in which port input I(0) (with waiting message traffic) participates and loses, developing a priority request that, in effect, accelerates its priority. This priority request is communicated to the output logic 32 of the desired port output by a 2-bit bus PR(0) that is coupled to the input logic 32 of all six port outputs. The bias logic receives, from the output logic 32 of the six port outputs the grant signals carried by the GRANT signal lines $GRANT(n)_m$.

If two or more port inputs I(0) $\ldots$, I(5) begin receiving message traffic at about the same time with destination addresses identifying the same port output (e.g., O(3)), some determination must be made as to which port input will be handled first, and which must wait; that is, access to the desired port output must be arbitrated to determine which port input goes first, and which must wait. According to the present invention, arbitration is conducted on two levels. Initially, a low level arbitration is employed in which contending port inputs are selected by a straight-forward round-robin process (although it should be apparent that other arbitration arrangements can be used. e.g., assigning fixed priorities). A high priority scheme comes into play when a port input having message traffic that has waited through a number of arbitrations and requests, by issuing a priority request, that it be taken out of turn.

The round-robin arbitration process is implemented by each port output O(0), O(1), $\ldots$, O(5) in response to the request signals R(n)$_m$ received from those port inputs having waiting message traffic to be routed to the port output. When a port input signals to be taken out of turn by asserting its associated priority request, the high level arbitration scheme is forced. As will be seen, when any port input has message traffic waiting to be routed to a port output, it monitors the arbitrations in which it participates for that port output. As the waiting mounts, the priority request is developed (in a manner described below) by the bias logic 70 from the input fraction (IF), described above, accorded each port input and maintained in bias register 72 (FIG. 3) of input logic 30.

The 2-bit priority requests from each of the port input (I(0), I(1), ..., I(5)) are coupled to the port outputs (O(0), O(1), ..., O(5)) by priority request busses (PR$_0$, PR$_1$, ..., PR$_5$). If a number of port inputs have waiting message traffic for one port output and are, therefore, vying for access to that port output, and their respective priority requests are zero, arbitration will be conducted, and one of the contending port inputs selected, using the round-robin process. If, on the other hand, one of the vying port inputs issues a non-zero priority request, that port input will be treated as having a higher priority and granted access out of turn during the next arbitration period. If more than one port input is requesting to be taken out of turn, arbitration is conducted by the port output between those port inputs having non-zero reference requests on a fixed priority basis. Before discussing how the priority requests are developed, and used, it will be beneficial to first understand the architecture of the port outputs O(0), O(1), ..., O(5).

Figure 4:
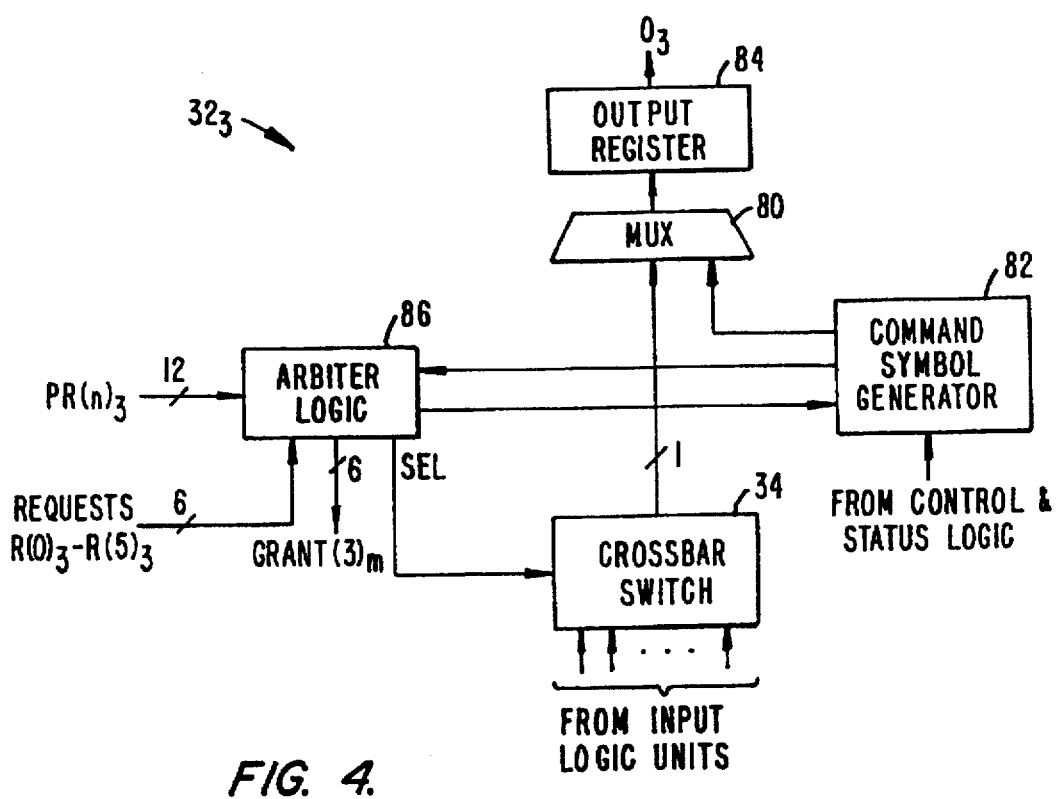
FIG. 4 is a simplified block diagram of the output logic associated with a port output of the router unit of FIGS. 1 and 2.

Referring now to FIG. 4, shown in simplified form is the architecture of output logic 32$_3$ for the port output O(3). The output logic 32 for the other port output O(0)–O(2) and O(4)–O(5) are of substantially identical construction. As FIG. 4 shows, the output of the crossbar switch 34 is received by a multiplexer (MUX) 80 of the output logic 32$_3$ which operates to select data from the crossbar switch 34 and an output of a command signal generator 82. Periodically, command symbols may need to be inserted and transmitted according to the network protocol being used— under direction and control of the control and status logic 36 (FIG. 2). The selection made by the MUX 80 is coupled to an output register 84, and from there transmitted from the port output O(3) to the I/O unit 14, via the network link 18, to which port 3 is connected (FIG. 1).

Arbitration is conducted at each port output by the arbiter 86. The arbiter 86 receives, from each of the respective port inputs I(0), I(1), ..., I(5), the request signal line R(n)$_3$ from the corresponding port output selection logic 66 (FIG. 3). If more than two of the request signals are asserted at the same time, the arbiter logic 86 will check the priority request signals of the requesting port inputs. If all are non-zero, the arbiter logic 86 will arbitrate the requests according to the priority of the round-robin scheme. If, however, one of the contending port inputs is requesting to be taken out of turn, indicated by a non-zero value on its associated priority request bus (e.g., PR(2) for input logic 30$_2$ of port 2), the arbiter logic 86 will grant access to that port input. If more than one port input is asserting its priority request, the arbiter logic 86 will arbitrate access according to the high priority scheme. If the 2-bit priority requests are equal, routing selection is made according to a fixed priority, and access will be granted then to port input having the highest preassigned priority. If the value on one 2-bit priority request bus is numerically greater than the others, the port input asserting that greater priority request is next selected.

Once arbitration is conducted, the arbiter logic 86 issues, on one of six signal lines (one each being coupled to the input logic 30 of a corresponding port input), a GRANT signal to the winning port input I(0) ..., I(5). In addition, the arbiter 86 issues a selection signal (SEL) to the crossbar switch 34 to cause the selected input logic 30 to be routed to the output logic.

Figures 5, 6:
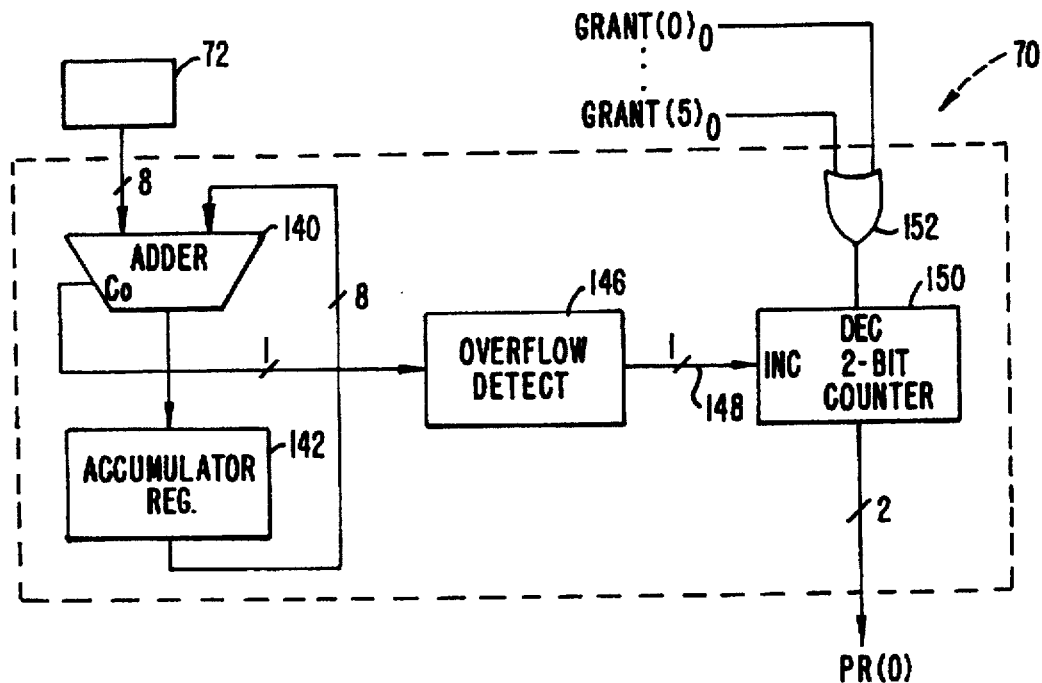
FIG. 5 is a block diagram of the logic used to develop the Priority Request to escalate the priority of a port input of FIG. 2 having waiting message traffic.
FIG. 6 is a diagrammatic illustration of a number of arbitration periods in which port inputs having message traffic arbitrate for access to an output.

FIG. 5 illustrates the bias logic 70 of input logic 32$_0$ for the port input I(0) in greater detail, where it is shown as including an 8-bit adder 140 and 8-bit accumulation register 142 combination which forms, in effect, the a free-running modulo-255 counter. The adder 140 receives the bias value assigned the corresponding port input (here, port input I(0)) maintained by the bias register 72, adding the bias value to the content of the accumulation register 142. The sum produced by the adder 140 is returned to the accumulation register 142, increasing its content by the IF value. The content of the accumulation register is so increased by the IF value each arbitration period in which the input logic 30$_0$ participates.

When the content of the accumulation register 142 is increased to the point that it exceeds the width of the adder 140 (i.e., is greater than 255), an overflow is signalled at the carry out (C$_o$) output of the adder 140. The overflow signal from the adder 140 is applied to an overflow detector circuit 146 to assert a responsive overflow signal at an output (OV) that, in turn, is coupled by a signal line 148 to the increment (INC) input of a 2-bit counter 150. Thus, the detected overflow of the counter 140 operates to increment the 2-bit counter 150. The content of the 2-bit counter 150 forms the 2-bit priority request value that is carried by the 2-bit priority request bus PR(0) from the input logic 30$_0$ to the output logic 32 of the six port outputs O(0), O(1), ..., O(5).

Before continuing, it is worth noting that the input fraction (IF) allocated port input I(0) is formed from the bias value contained in the bias register 72, which comprises the numerator of the fraction, and the size of the accumulator register 142, which is in effect the denominator. Thus, for port input I(0), if the bias value held in the register 72 is 64 (a value used in an example discussed below with respect to FIG. 6), the input fraction for port input I(0) is 64/256 or 1/4.

The 2-bit counter 150 includes a decrement (DEC) input that receives the output of a six-input OR gate 152. A GRANT signal is conducted from each of the port outputs to the OR gate 152 where they are applied as inputs thereto. When the associated port input (i.e., port input I(0)) participates in arbitrating for access to a port output with a non-zero value in the 2-bit counter 150, and wins arbitration, the resultant GRANT signal from the port output will decrement the 2-bit counter 150. Preferably, the 2-bit counter 150 is designed so that it will not underflow, i.e., when the content of the counter is a ZERO value, the DEC input disregards the output of the OR gate 152.

The 2-bit priority request bus PR(0), together with those from the other port inputs I(1), ..., I(5), form the six priority busses PR(n) (n=0, 1, ..., 5) that couple priority requests from port inputs to the arbiter logic unit 86 (FIG. 4) of each of the port outputs. As explained, the arbiter logic unit also receives 36 request lines R(n)$_m$, six each from each of the six port inputs, carrying request signals that identify to the port outputs which port inputs are vying for access.

The arbiter logic 86 is a combinatorial logic circuit (or a programmable logic array (PLA) element) of generally conventional design, constructed to determine from the states of the priority requests carried by the priority busses PR(0), ..., PR(5) of the contending ports which is to receive access, and to route that access by the SEL signal that is, as described above, applied to the crossbar switch 34. If there are no counts in any of the 2-bit counters the arbiter logic unit operates according to the round-robin process, selecting a one of the contending ports based upon who last gained access according to that process, and who is next in order. On the other hand, should one or more contending ports have asserted a priority request signal, the one having the highest priority request will be granted access (i.e., the port input whose 2-bit counter 150 has the highest count). If there is a tie between priority requests of two or more port inputs whose 2-bit counters 150 contain the same count, the arbiter will imposes a fixed priority scheme (discussed below), and issue a GRANT signal to the selected port input.

The low level round-round arbitration is used for normal message traffic; the high level arbitration is forced according to the number of times the port has participates in arbitration unsuccessfully and the IF value it is assigned. The high priority scheme is entered when the port's 2-bit counter 150 contains a non-zero count.

Operation of the invention will now be described, facilitated by reference to FIG. 6. FIG. 6 illustrates arbitration of ports 0, 1, and 2 (seeking access to the same port output) over the arbitration periods T–T+8, and beyond. The leftmost column identifies each of the arbitration periods, and the other columns contain representations of the contents of the register 142, together with the count of the 2-bit counter (shown in brackets), during each arbitration period. The port winning arbitration during any arbitration period is indicated by the darkened accumulator value. The IF values allocated each of the ports 0, 1, and 2 are shown in the parenthesis at the top of each column. (Here, the bandwidth for an output port is represented by the overflow value of the "counter" formed by the adder 140 and accumulator register 142. It will be evident to those skilled in this art that other values can be used, depending upon how fine or course the division of the bandwidth of a port output is to be, and the maximum wait for message traffic.)

FIG. 6 assumes that incoming message traffic only for ports 0, 1, and 2 are vying for a particular port output (e.g., port output O(4)). For clarity, the other ports are assumed not to participate and, therefore, are not shown. Further, it is assumed that message traffic is stacked at each port; that is, when the incoming message traffic for a port has been arbitrated, and routed to the port output O(4) for re-transmission, another incoming message is present.

Returning to FIG. 6, initially, at some time (T–t) prior to the first arbitration period, T, the content of the registers 142 of ports 0, 1, and 2 will be empty. Thus, assuming that all three port inputs 0, 1, 2, have message traffic bound for port 4, port 0, having being the first in the round robin scheme (and no counts being in any of the counters 150), will win the arbitration of arbitration period T. At the end of that arbitration period, each register 142 at the ports 0, 1, 2 will be incremented by their assigned bias values so that, for the next arbitration period T+1 the bias values are as indicated. Since there has been no overflow, and the associated 2-bit counters 150 remain empty, and the round-robin arbitration of arbitration period T+1 selects the next port in line for access to port 4, port input 1 (as indicated in bold in FIG. 6). The registers 142 are again incremented. Now, the register 142 of port 2 experiences an overflow and returns to ZERO, and the associated 2-bit counter 150 is incremented to a "1."

Thus, during the next successive arbitration period T+2, the arbiter logic 86' (of the port output O(4) of port 4) will note that port 2 has a count in the 2-bit counter 150, while the others do not and, therefore, the arbitration period T+2 results in selection of port 2. At the completion of that arbitration period the 2-bit counter 150 is decremented by 1, and all registers 142 again incremented by the assigned bias values.

Arbitration T+3 sees no counts in the counters 150, so the round-robin arbitration scheme is again resorted to, granting access to the port next in line, port 2. Again, the registers 142 are incremented.

Arbitration period T+4 coincidentally sees all registers 142 rolled over to ZERO to produce an overflow that results in all counters 150 containing a count of "1." The counts in the counters 150 are all equal (and non-zero), then ties are broken by resort to a fixed priority scheme such as, for example, looking first to port 0, then port 1, and so on down the line until port 4. (Obviously, as between port 5 and any other port, the other port will always win.) Thus, in this case, port 0 will win the arbitration. The registers 142 are again increased with the corresponding assigned bias values, while the 2-bit counter of port 0 is decremented by 1 by signalling on the DECREMENT signal line from the port output in question.

Arbitration period T+5 finds ports 1 and 2 still containing counts of 1 in their counters 150—another tie. The tie is again broken by using the fixed priority scheme so that this time port 1, having a higher fixed priority than port 2, is selected, and its counter 150 decremented by 1.

Arbitration period T+6 finds the counter of port 2 incremented to the count of "2." Since it is the only one now having a count in its counter 150, it will gain access to port 4 (even though, coincidentally, it is next in the low level, round-robin scheme), and the counter 150 of port 2 decremented.

Arbitration period T+7 still finds the port 2 as the only one with a non-zero count in its counter 150 and, therefore, it will again be selected for access to port 4, and its counter decremented. At the completion of that arbitration period, when the registers 142 of the ports 0, 1, 2 are incremented, all roll over to a ZERO value and all have a count of "1" in their counters 150. Arbitration periods T+8, and following, will now repeat the arbitration periods T+4, . . . , T+7.

As can be seen from perusal of FIG. 6, the pattern shows that port 2 wins arbitration one-half the time (128/[64+64+128]=$128/256$). Each of the ports 0 and 1, on the other hand, will win arbitration one-fourth of the time ($64/256$). Hence, this scheme may be used to allocate bandwidth according to the ratio of the assigned bias values to $2^n$ where n is the width of the biased arbitration counter 142 (here, 8 bits). However, different width counters can be used to implement the counter 142 to achieve greater resolution in the ratios for allocating bandwidth. In addition, although a 2-bit counter is sufficient for routers having six ports, routers having more than six ports will need more than the 2-bit counter 150.

Also, there are other ways of implementing the low-level scheme rather than using round-robin arbitration; fixed priority could be used, or information in the messages themselves could be used to effect arbitration, still in conjunction with the disclosed high-level scheme. Further, the fixed priority scheme used to break ties in the high-level scheme could be changed to some other predetermined priority, implemented with various forms of combinatorial logic (e.g., gates, programmable logic arrays, look-up tables, and the like).

What is claimed is:

1. In a data communication device having at least a pair of inputs and an output, the device operating to receive message data at the pair of inputs for communication to and re-transmission from the output, a method for biasing arbitration between the pair of inputs contending for access to the output, including the steps of:

providing each of the inputs with an assigned value;

developing from the assigned value, for each of the inputs, an accumulated value and a priority value, the priority value being a count of the number of times the accumulated values realizes a predetermined value;

selecting a one of the pair of inputs for communication to the output on a first predetermined basis when the priority values of each of the pair of inputs are equal;

selecting a one of the pair of inputs for communication to the output on a second predetermined basis when the priority values of each of the pair of inputs are not equal; and modifying the accumulated value of each of the pair of inputs having message data for communication to the output using the corresponding assigned value.

2. The method of claim 1, wherein the modifying step includes decrementing the priority value of the one of the pair of inputs selected on the second predetermined basis.

3. The method of claim 1, wherein the modifying step includes the step of adding the assigned value to the corresponding accumulated value of each one of the pair of inputs not selected.

4. In a data communication device having a plurality of inputs and at least one output, the data communication device operating to receive data at the plurality of inputs for re-transmission from the output, apparatus for selecting among a number of the plurality of inputs having data for communication to and from the output, the apparatus comprising:

for each the plurality of inputs:

(a) an arithmetic unit coupled to receive an assigned value to produce therefrom a modified value that is changed by the assigned value when such one of the plurality of inputs participates in arbitration for access to the output;

(b) a counter coupled to the arithmetic unit to increment a count when the modified value equals or exceeds a predetermined value; and arbiter logic to receive the count from each of the plurality of inputs to select a one of the number of inputs for communication of data from the one of the number of inputs to the output according to a first order when the count is a first value, and to select the one of the number of inputs according to a second order when the count from any of the plurality of inputs is not the first value.

5. The apparatus of claim 4, wherein the modified value produced by the arithmetic unit is a sum.

6. The apparatus of claim 5, wherein the arithmetic unit includes a carry-out output whereat a carry signal is asserted when the sum produced by the arithmetic unit results in a carry.

7. The apparatus of claim 6, wherein the carry signal is coupled to the digital counter to increment the count.

8. The apparatus of claim 4, wherein the first order is a round-robin order.

9. The apparatus of claim 4, wherein the second order is based upon the count of each of the plurality of inputs.

10. The apparatus of claim 9, wherein the second order includes a fixed priority order used to select the one of the plurality of inputs when the count from the plurality of inputs is not the first value and are equal.

11. A method of granting one of a number of data elements access to a shared communication medium, the method including the steps of:

for each of the number of data elements,
providing the data element with an assigned bias value;
developing from the assigned bias value an accumulated value;
maintaining a count value that is indicative of each time the accumulated value realizes a predetermined value;

selecting the one of the data elements for access to the shared medium on a first predetermined basis when the counts of the data elements are equal;

selecting the one of the data elements for access to the shared medium on a second predetermined basis when the count values of the data elements are all not equal.

12. The method of claim 11, including the step of decrementing the count value of the one of the data elements when selected on the second predetermined basis.

13. The method of claim 11, wherein the developing step includes adding the assigned value to the accumulation value of each of the data elements each time a one the data elements is selected.

* * * * *